United States Patent
Kim et al.

(10) Patent No.: US 9,131,505 B2
(45) Date of Patent: Sep. 8, 2015

(54) BASE STATION AND METHOD FOR PROVIDING UPLINK SERVICE

(75) Inventors: Juhee Kim, Daejeon (KR); Eunkyung Kim, Seoul (KR); Sook Jin Lee, Daejeon (KR); Kyung Soo Kim, Daejeon (KR)

(73) Assignees: ELECTRONICS AND TELECOMMUNICATIONS RESEARCH INSTITUTE, Daejeon (KR); Samsung Electronics Co. Ltd., Suwon-si (KR)

( * ) Notice: Subject to any disclaimer, the term of this patent is extended or adjusted under 35 U.S.C. 154(b) by 1469 days.

(21) Appl. No.: 12/613,942

(22) Filed: Nov. 6, 2009

(65) Prior Publication Data

US 2010/0111045 A1  May 6, 2010

(30) Foreign Application Priority Data

Nov. 6, 2008  (KR) .................. 10-2008-0109917
Nov. 6, 2009  (KR) .................. 10-2009-0106897

(51) Int. Cl.
*H04W 72/04* (2009.01)
*H04W 72/12* (2009.01)

(52) U.S. Cl.
CPC ...... *H04W 72/0466* (2013.01); *H04W 72/1268* (2013.01)

(58) Field of Classification Search
CPC .................. H04W 72/04; H04W 72/0466
USPC ................. 370/329, 330, 341, 395.21, 395.3, 370/395.4, 395.41; 455/452.2
See application file for complete search history.

(56) References Cited

U.S. PATENT DOCUMENTS

| | | | |
|---|---|---|---|
| 7,912,425 B2* | 3/2011 | Ihm et al. ................. | 455/39 |
| 8,055,268 B2* | 11/2011 | Lee et al. ................. | 455/452.2 |
| 8,310,993 B2* | 11/2012 | Speight ................... | 370/328 |
| 2004/0076181 A1* | 4/2004 | Pantelias et al. ......... | 370/468 |
| 2007/0133416 A1 | 6/2007 | Hyon et al. | |
| 2007/0274265 A1* | 11/2007 | Yoon et al. .............. | 370/335 |
| 2008/0137618 A1* | 6/2008 | Sung et al. ............... | 370/336 |
| 2008/0181168 A1* | 7/2008 | Han et al. ................ | 370/315 |
| 2009/0190560 A1 | 7/2009 | Kim et al. | |

FOREIGN PATENT DOCUMENTS

| | | | |
|---|---|---|---|
| KR | 10-2006-0034539 A | 4/2006 |
| KR | 10-0625245 B1 | 9/2006 |
| KR | 10-2007-0063351 A | 6/2007 |
| KR | 10-0874002 B1 | 12/2008 |
| KR | 10-2009-0040119 A | 4/2009 |
| KR | 10-2009-0058200 A | 6/2009 |
| WO | 2009/051422 A2 | 4/2009 |

* cited by examiner

*Primary Examiner* — Christopher Grey
(74) *Attorney, Agent, or Firm* — Jefferson IP Law, LLP

(57) ABSTRACT

A method for providing uplink service from a base station to a terminal includes: transmitting information on a TCP packet and a dedicated code to a terminal; receiving a code number from the terminal using the dedicated code; searching a requesting bandwidth for the code number and allocating resources to the terminal; and receiving the ACK packet for the TCP packet through the allocated resources from the terminal.

10 Claims, 3 Drawing Sheets

BASE STATION AND METHOD FOR PROVIDING UPLINK SERVICE

CROSS-REFERENCE TO RELATED APPLICATION

This application claims priority to and the benefit of Korean Patent Application Nos. 10-2008-0109917 and 10-2009-0106897 filed in the Korean Intellectual Property Office on Nov. 6, 2008 and Nov. 6, 2009, the entire contents of which are incorporated herein by reference.

BACKGROUND OF THE INVENTION (a) Field of the Invention

The present invention relates to a method for providing uplink service that provides high-speed data services between a terminal and a base station in a wireless communication system.

(b) Description of the Related Art

When a downlink transmission control protocol (TCP) traffic is transferred through a base station to a terminal in a wireless communication system, the TCP receiver in the terminal sends acknowledge (ACK) for the received data packets to the TCP sender through wireless interface, such that the transmission of one TCP data is completed.

In detail, the terminal receiving the TCP data packets from the base station generates the ACK packet and attempts a wireless access to transmit the uplink traffic, which includes the generated ACK, to the base station. Thereafter, when the uplink access request is successfully received by the base station, the terminal is allocated with resources for the ACK transmission by the base station and transmits the ACK to the base station using the allocated resources.

At this time, in order to transmit the ACK to the base station, the random access attempted by the terminal should perform an access through the users' contention. As a result, a code collision probability increases in proportion to the number of users and the amount of traffic. Further, if the initial wireless access fails, the terminal should attempt an access after a long period of backoff time. This unexpected delay might have a serious effect on TCP session throughput, and lead to deteriorate the wireless network performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a base station and a method for providing uplink service that provide high-speed data service between a terminal and a base station in a wireless communication system.

An exemplary embodiment of the present invention provides a method for providing uplink service from a base station to a terminal including: allocating a code, which is temporarily dedicated to a terminal, depending on the transmission of downlink traffic to the terminal, transmitting the allocation information of the dedicated code when the downlink TCP packets is transmitted; receiving the dedicated code from the terminal; searching a requesting bandwidth for the code number and allocating resources to the terminal; and receiving the ACK packet for the TCP packet through the allocated resources from the terminal.

Another exemplary embodiment of the present invention provides a method for providing uplink service from a terminal including: receiving information on a TCP packet and a dedicated code from a base station; transmitting a code number to the base station using the dedicated code; and transmitting the ACK packet for the TCP packet to the terminal from the base station using the allocated resources.

Yet another exemplary embodiment of the present invention provides a base station including: when TCP packets to be transmitted to a terminal are generated, a determining unit that determines whether a dedicated code for the terminal is allocated; if the determining unit determines that the dedicated code for the terminal is not allocated, a dedicated allocation unit that allocates the dedicated code for the terminal; a transmitting/receiving unit that transmits information on the TCP packet and the dedicated code to the terminal and receives the code number from the terminal using the dedicated code; and a resource allocation unit that allocates the resources to the terminal based on the requesting bandwidth for the code number.

According to an exemplary embodiment of the present invention, the terminal, the base station, and the method for providing uplink service that provide the high-speed data services between the terminal and the base station in the wireless communication system can be provided.

DETAILED DESCRIPTION OF THE EMBODIMENTS

Figure 1:
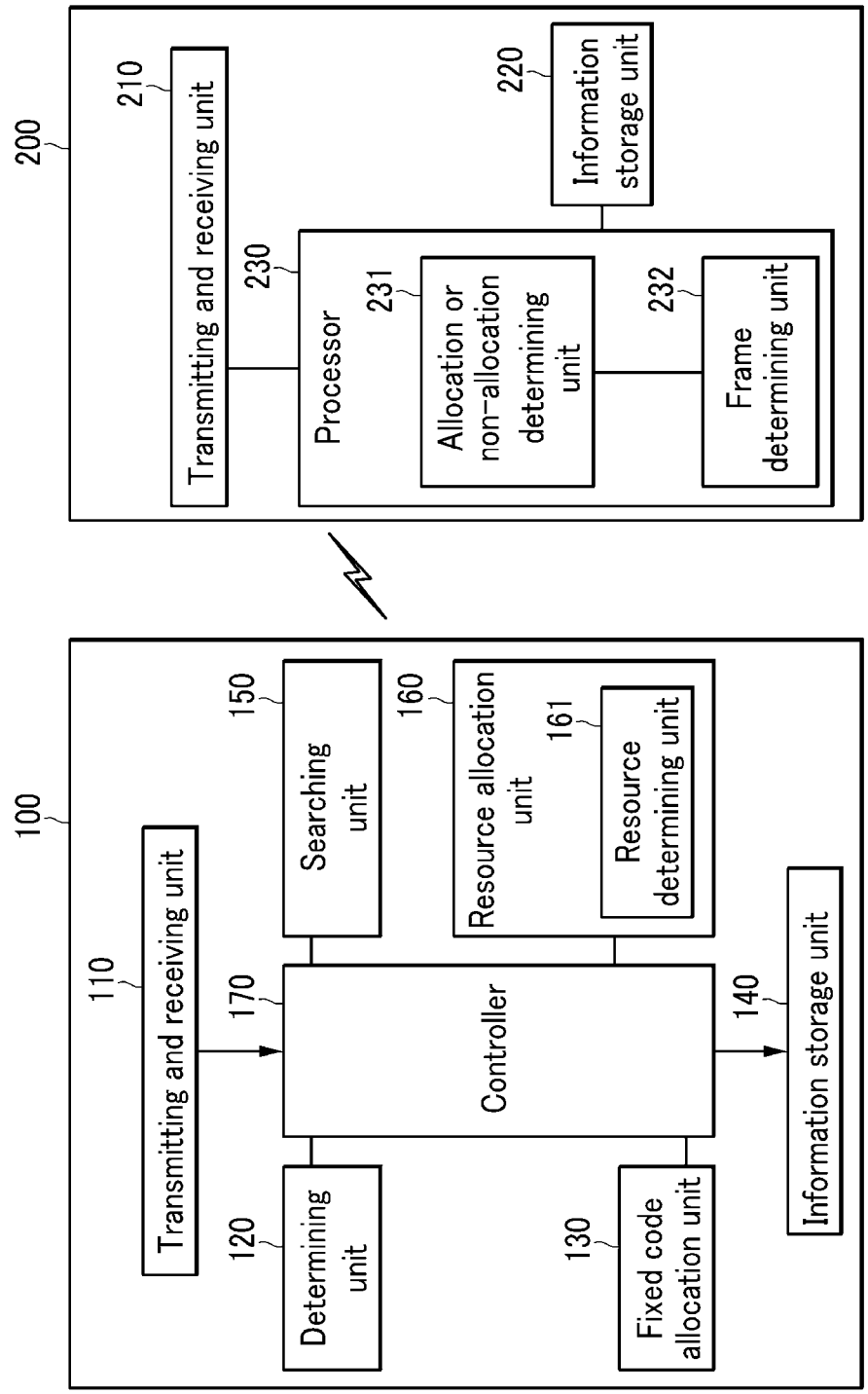
FIG. 1 is a diagram conceptually showing a communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

In this specification, a base station (BS) may designate an access point (AP), a node B, an evolved node B (eNodeB), a radio access station (RAS), a base transceiver station (BTS), a mobile multiphone relay (MMR)-BS, etc and may include functions of all or a part of the node B, the eNodeB, the AP, the RAS, the BTS, the MMR-BS, etc.

Further, a terminal may designate an access terminal (AT), a mobile terminal (MT), a mobile station (MS), a subscriber station (SS), a portable subscriber station (PSS), a user equipment (UE), etc. and may include functions of all or a part of the AT, the MT, the MS, the SS, the PSS, the UE, etc.

Hereinafter, a base station and a method for providing uplink service according to an exemplary embodiment of the present invention will be described in detail with reference to the accompanying drawings.

FIG. 1 is a diagram conceptually showing a communication system according to an exemplary embodiment of the present invention. Referring to FIG. 1, a communication system according to an exemplary embodiment of the present invention includes a base station 100 and a terminal 200.

The base station 100 includes a transmitting/receiving unit 110, a determining unit 120, a dedicated code allocation unit 130, a information storage unit 140, a searching unit 150, a resource allocation unit 160, and a controller 170.

The determining unit 120 determines whether a dedicated code is allocated to the terminal 200 when a downlink TCP packet to be transmitted to the terminal 200 is generated.

The dedicated code allocation unit 130 allocates the dedicated code to the terminal 200 and determines a code use duration and a code use interval of the allocated dedicated code.

The code use duration means a duration where the terminal 200 can use the allocated dedicated code and the code use interval means a frame interval where the terminal 200 can use the allocated dedicated code.

At this time, the code use duration and the code use interval may be determined by a load state, a resource state, and quality of service (QoS) of the terminal 200.

The transmitting/receiving unit 110 transmits the code allocation information and the downlink TCP packet to the terminal 200 and receives the code number or the ACK packet from the terminal 200.

The code allocation information includes a code number, code use duration, and code use interval of the dedicated code that are allocated to the terminal 200.

At this time, the code allocation information is transmitted in a media access control (MAC) message form, is transmitted in a sub header in a protocol data unit (PDU) transmitting the TCP packet, or may be input to a specific field in the MAP including a downlink traffic transmission information and may be transmitted to the terminal 200.

In the wireless communication system, the number of CDMA codes for random access is limited. Therefore, when the dedicated code allocated to the terminal 200 is a code division multiple access (CDMA) code, the code use efficiency can be increased using the code use duration and the code use interval.

Figure 2:
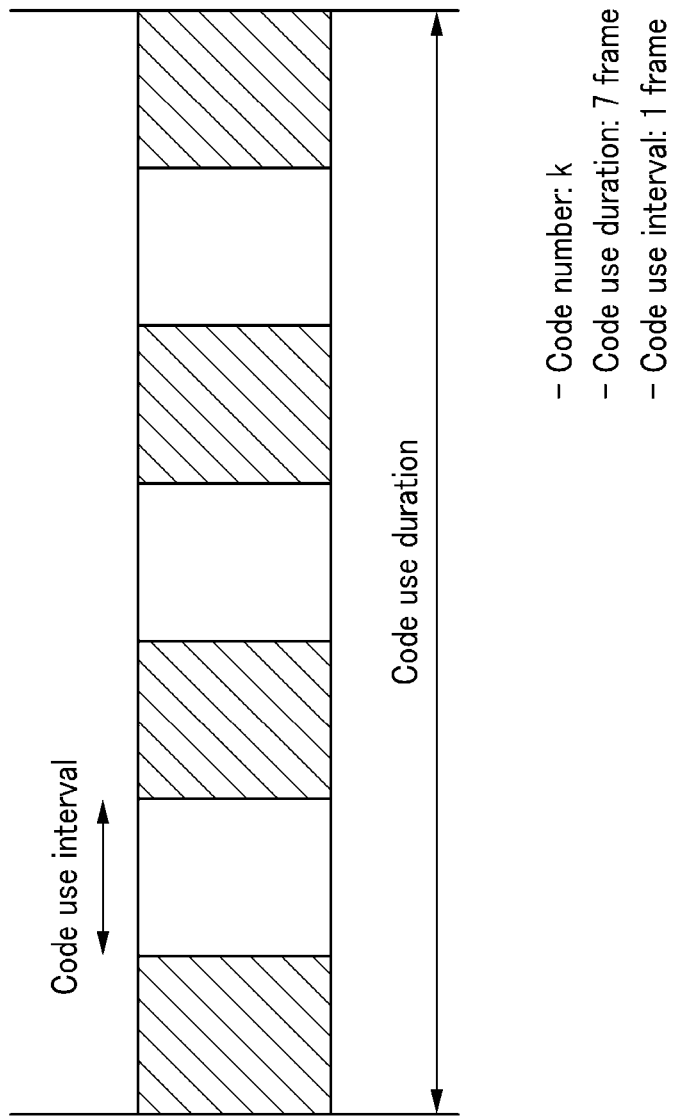
FIG. 2 is a diagram showing one example of a duration where a terminal 200 can access a base station 100 using a dedicated code, according to an exemplary embodiment of the present invention.

FIG. 2 is a diagram one example of duration where the terminal 200 can access the base station 100 using the dedicated code, according to the embodiment of the present invention. FIG. 2 shows a case where the code number of the dedicated code allocated to the terminal 200 is k, the code use duration is 7 frames, and the code use interval is 1 frame.

In FIG. 2, the terminal 200 can access the base station 100 using the dedicated code having the code number of k, at 1 frame interval, which is the code use interval, among the entire code use duration (7 frames).

Referring again to FIG. 1, the information storage unit 140 stores information on the code number, the code use duration, and the code use interval that are allocated to the terminal 200 in the dedicated code allocation unit 130. Further, the information storage unit 140 stores the requesting bandwidth information for services used by the terminal 200.

The searching unit 150 searches the terminal 200 and services corresponding to the code number in question the information storage unit 140 based on the frame and the code number received through the transmitting/receiving unit 110 from the terminal 200.

The resource allocation unit 160 includes a resource determining unit 161 and when the terminal 200 and services corresponding to the code number received through the transmitting/receiving unit 110 are searched in the searching unit 150, the resource, which can be allocated at the current frame, is allocated to the terminal 200.

The resource determining unit 161 searches the requesting bandwidth for the corresponding service stored in the information storage unit 140 to determine whether the size of the available resources for the terminal 200 at the current frame is larger than the requesting bandwidth.

If the resource determining unit 161 determines that the size of the resource allocatable to the terminal 200 at the current frame is smaller than the requesting bandwidth for the corresponding service, the resource allocation unit 160 allocates the resource having the size of the resource, which can be allocated at the current frame, to the terminal 200.

On the other hand, if the resource determining unit 161 determines that the size of the available resource for the terminal 200 at the current frame is larger than the requesting bandwidth for the corresponding service, the resource allocation unit 160 allocates the resource having the requesting bandwidth for the corresponding service to the terminal 200.

The controller 170 controls the operations of the transmitting/receiving unit 110, the determining unit 120, the dedicated code allocation unit 130, the search unit 150, and the resource allocation unit 160.

The terminal 200 includes a transmitting/receiving unit 210, an information storage unit 220, and a processor 230.

The transmitting/receiving unit 210 receives the code allocation information from the base station 100 and stores the received code allocation information in the information storage unit 220. In addition, the transmitting/receiving unit 210 uses the resource allocated from the base station 100 and transmits the ACK packet, which is a response for the downlink TCP packet, to the base station 100.

The information storage unit 220 stores the code allocation information received from the base station 100.

The processor 230 includes an allocation or non-allocation determining unit 231 and a frame determining unit 232 and inserts the code number of the allocation information (e.g., a case of FIG. 2 is 'k') in the header for requesting a band at a frame to be transmitted to the base station 100 and transmits it to the base station 100 through the transmitting/receiving unit 210.

When the allocation or non-allocation determining unit 231 receives the uplink data to be transmitted from the upper layer to the base station 100, for example, ACK for the TCP packet, it determines whether the dedicated code is allocated based on the code use duration of the allocation information stored in the information storage unit 220.

If the allocation or non-allocation determining unit 231 determines that the accessible dedicated code is allocated to the base station 100, the frame determining unit 232 determines whether the current frame is an accessible frame based on the code use interval stored in the information storage unit 220.

Hereinafter, a method for providing uplink service according to an exemplary embodiment of the present invention will be described with reference to the accompanying drawings.

Figure 3:
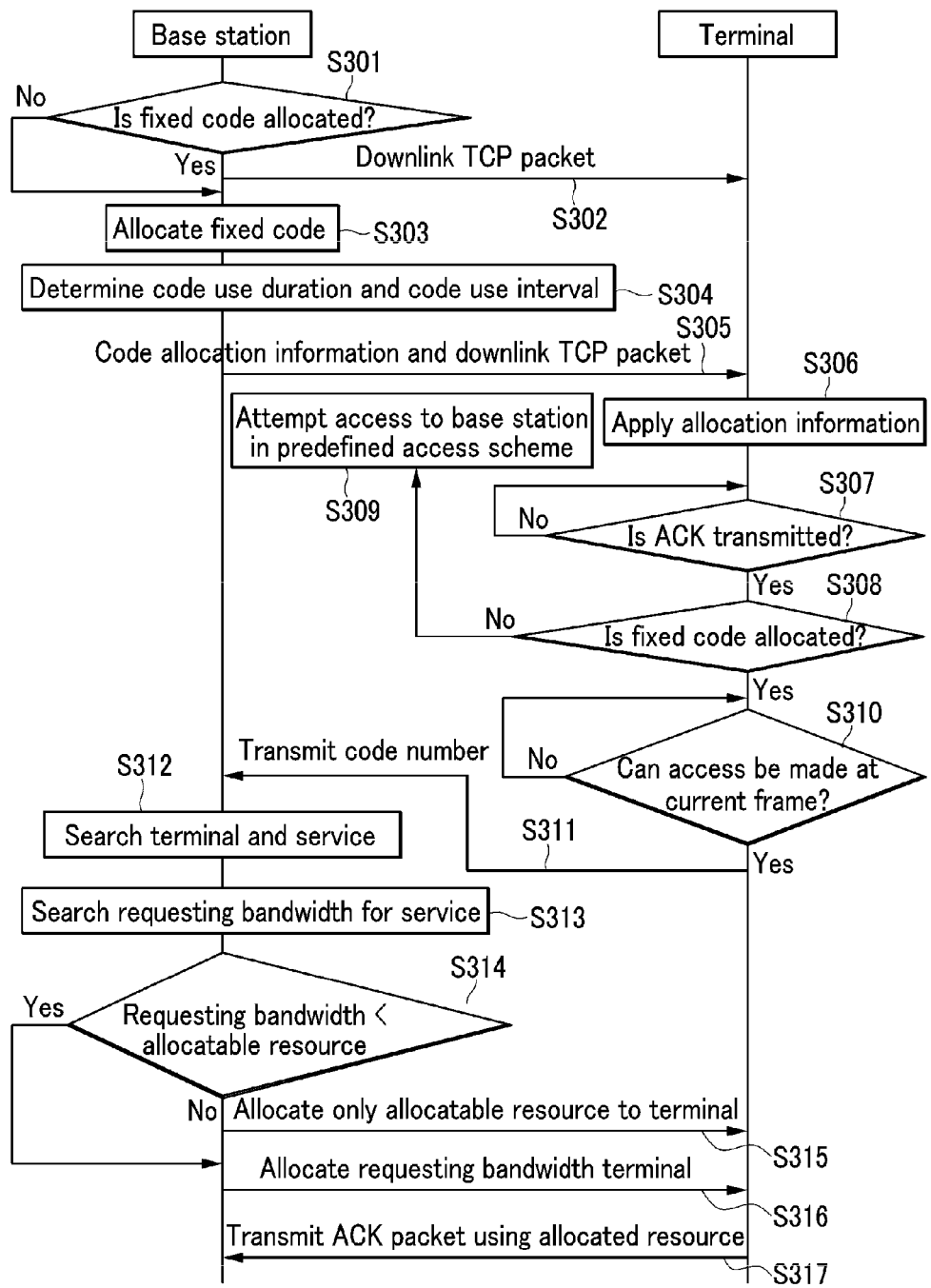
FIG. 3 is a flowchart showing a method for providing uplink service according to the exemplary embodiment of the present invention.

FIG. 3 is a flowchart showing a method for providing uplink service according the exemplary embodiment of the present invention. Referring to FIG. 3, the base station 100 determines whether the dedicated code is allocated to the terminal 200 when the downlink TCP packet to be transmitted to the terminal 200 is generated (S301).

When the dedicated code is allocated to the terminal 200, the base station 100 transmits the downlink TCP packet to the terminal 200 (S302).

On the other hand, when the dedicated code is not allocated to the terminal 200, the base station 100 allocates the dedicated code to the terminal 200 (S303) and determines the code use duration and the code use interval of the allocated dedicated code (S304). Thereafter, the base station 100 transmits the code allocation information and the downlink TCP packet to the terminal 200 (S305).

The terminal 200 receiving the code allocation information from the base station 100 applies the allocation information received from the next frame (S306).

Thereafter, when the uplink data to be transmitted from the upper layer of the terminal 200 to the base station 100, for example, the ACK for the downlink TCP packet are received (S307), the terminal 200 determines whether the dedicated code is allocated based on the code use duration of the received allocation information (S308).

When the dedicated code accessible the base station 100 is not allocated, the terminal 200 attempts an access to the based station by a predetermined access scheme, for example, a falling scheme, a scheme waiting for unicast allocation, or a scheme to attempt random access (S309).

On the other hand, when the accessible dedicated code is allocated to the base station, the terminal 200 determines whether the current frame is an accessible frame based on the code use interval of the received allocation information (S310).

When the base station using the dedicated code cannot be access at the current frame, the terminal 200 waits up to the frame that can access the base station 100 based on the code use interval of the allocation information.

On the other hand, if the current frame is a frame that can access the base station, the terminal 200 inserts the code number (e.g., a case of FIG. 3 is 'k') of the allocated information into the header for requesting a band at the current frame and transmits it to the base station 100 (S311).

The base station 100 receiving the code number from the terminal 200 searches the terminal 200 and service corresponding to the corresponding code number based the received frame and code number (S312). At this time, when the terminal 200 and service corresponding to the received code number do not exist in the information storage unit 140, the base station 100 stops the operation of the received code number.

On the other hand, when the terminal 200 and services corresponding to the received code number are searched, the base station 100 searches the requesting bandwidth that stores the corresponding service (S313) and determines whether the size of the resource, which can be allocated to the terminal at the current frame, is larger than the requesting bandwidth (S314).

When the size of the resource, which can be allocated to the terminal at the current frame, is smaller than the requesting bandwidth, the base station 100 allocates the resource, which can be allocated at the current frame, to the terminal 200 (S315). When the size of the current available resource is smaller than a bandwidth for transmitting a BR-REQ header that is a basic unit of the band allocation, the base station 100 allocates the resource to the terminal 200 at the next frame.

On the other hand, when the size of the resource available for the terminal 200 at the current frame is larger than the requesting bandwidth, the base station 100 allocates the resource of the requesting bandwidth to the terminal 200 (S316).

The terminal 200 allocated with the resource from the base station 100 transmits the ACK packet, which is a response for the downlink TCP packet, to the base station 100 using the allocated resource (S317).

At this time, when the requesting bandwidth is smaller than the size of the resource allocated from the base station 100, the terminal 200 can request the additional band using the BR-REQ header, the piggybacked BR-REQ sub header, etc., of the frame to the base station.

With the exemplary embodiment of the present invention, the base station 100 transmits the information on the dedicated code to be used for the transmission of the response traffic together with the downlink traffic to the terminal 200, such that the terminal 200 accesses the base station using the allocated dedicated code to transmit the response traffic.

In other words, the terminal 200 solves the uplink access delay problem in transmitting the response traffic for the downlink traffic to the base station by interworking with the downlink traffic transmission to allocate the dedicated code for the uplink access, thereby making it possible to improve the data speed.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing an uplink service from a base station to a terminal, the method comprising:
   allocating a dedicated code, which is temporarily dedicated to the terminal, depending on a transmission of downlink TCP packets to the terminal;
   transmitting allocation information of the dedicated code when the downlink TCP packets are transmitted;
   receiving the dedicated code from the terminal;
   searching a requesting bandwidth for a code number and allocating resources to the terminal; and
   receiving an ACKnowledgement (ACK) packet for the downlink TCP packets based on the allocated resources from the terminal,
   wherein the allocation information of the dedicated code comprises:
      the code number to be used to access the base station;
      a code use duration that is a duration using the dedicated code; and
      information on a code use interval that is a frame interval using the dedicated code.

2. The method for providing the uplink service of claim 1, wherein the transmitting of the allocation information of the dedicated code when the downlink TCP packets are transmitted comprises:
   determining whether the dedicated code for the terminal is allocated, when a TCP packet to be transmitted to the terminal is generated;

allocating the dedicated code to be used for uplink access of the terminal, when the dedicated code for the terminal is not allocated; and determining the code use duration and the code use interval.

3. The method for providing the uplink service of claim 1, wherein the allocating of the resources comprises:

searching the terminal and a service for the code number;

searching the requesting bandwidth for the service; and determining whether a size of an available resource for the terminal at a current frame is larger than the requesting bandwidth.

4. The method for providing the uplink service of claim 3, wherein the allocating of the resource resources further comprises:

allocating a resource of the requesting bandwidth to the terminal, if the size of the available resource for the terminal at the current frame is larger than the requesting bandwidth; and allocating the available resource to the terminal, if the size of the available resource at the current frame is smaller than the requesting bandwidth.

5. A method for providing an uplink service from a terminal, the method comprising:

receiving a TCP packet and information on a dedicated code from a base station;

transmitting a code number to the base station using the dedicated code; and transmitting an ACKnowledgement (ACK) packet for the TCP packet to the base station using allocated resources, wherein the information on the dedicated code comprises:

the code number to be used to access the base station;

a code use duration that is a duration using the dedicated code; and information on a code use interval that is a frame interval using the dedicated code.

6. The method for providing the uplink service of claim 5, wherein the transmitting of the code number comprises:

determining whether the dedicated code is allocated based on the code use duration, when the ACK packet is generated;

determining whether a current frame is a frame accessible to the base station based on the code use interval, when the dedicated code is allocated; and transmitting the code number to the base station using the dedicated code, when the current frame is a frame accessible to the base station.

7. A base station, comprising:

a determining unit that determines whether a dedicated code for a terminal is allocated, when TCP packets to be transmitted to the terminal are generated;

a dedicated allocation unit that allocates the dedicated code for the terminal, if the determining unit determines that the dedicated code for the terminal is not allocated;

a transmitting/receiving unit that transmits the TCP packets and information on the dedicated code to the terminal and receives a code number from the terminal using the dedicated code; and a resource allocation unit that allocates the resources to the terminal based on a requesting bandwidth for the code number, wherein the information on the dedicated code comprises:

the code number to be used to access the base station;

a code use duration that is a duration using the dedicated code; and information on a code use interval that is a frame interval using the dedicated code.

8. The base station of claim 7, wherein the transmitting/receiving unit receives an ACKnowledgement (ACK) packet for a TCP packet through an allocated resource from the terminal.

9. The base station of claim 7, wherein the resource allocation unit comprises a resource determining unit that searches the requesting bandwidth for the service and determines whether a size of an available resource for the terminal at a current frame is larger than the requesting bandwidth.

10. The base station of claim 9, wherein the resource allocation unit allocates a resource of the request bandwidth to the terminal, if the resource determining unit determines that the size of the available resource for the terminal at the current frame is larger than the requesting bandwidth, and allocates the resource allocatable to the terminal to the terminal, if the resource determining unit determines that the size of the available resource for the terminal at the current frame is smaller than the requesting bandwidth.

\* \* \* \* \*